US008948386B2

(12) United States Patent
Campagna et al.

(10) Patent No.: US 8,948,386 B2
(45) Date of Patent: Feb. 3, 2015

(54) AUTHENTICATION OF A MOBILE DEVICE BY A NETWORK AND KEY GENERATION

(75) Inventors: Matthew John Campagna, Ridgefield, CT (US); Robert John Lambert, Cambridge (CA); Anthony Rosati, Ottawa (CA)

(73) Assignee: Certicom Corp., Mississauga (CA)

( * ) Notice: Subject to any disclaimer, the term of this patent is extended or adjusted under 35 U.S.C. 154(b) by 107 days.

(21) Appl. No.: 13/534,948

(22) Filed: Jun. 27, 2012

(65) Prior Publication Data

US 2014/0003604 A1    Jan. 2, 2014

(51) Int. Cl.
*H04L 29/06* (2006.01)
*H04L 9/08* (2006.01)

(52) U.S. Cl.
CPC ................ *H04L 9/08* (2013.01); *H04L 9/0844* (2013.01); *H04L 2209/80* (2013.01)
USPC ............... 380/247; 380/277; 380/44; 380/28; 713/171

(58) Field of Classification Search
CPC ... H04L 9/0844; H04L 9/3066; H04L 9/3013; H04L 63/061; H04L 9/0841; G06F 7/725
USPC ..................... 380/247, 255, 270, 277, 44, 28; 713/150, 168, 171
See application file for complete search history.

(56) References Cited

U.S. PATENT DOCUMENTS

| | | | | |
|---|---|---|---|---|
| 5,537,474 | A * | 7/1996 | Brown et al. | 380/248 |
| 7,856,102 | B2 | 12/2010 | Hatakeyama | |
| 2009/0209232 | A1 | 8/2009 | Cha et al. | |
| 2010/0049542 | A1 | 2/2010 | Benjamine et al. | |
| 2010/0153728 | A1 | 6/2010 | Brown | |
| 2010/0228980 | A1 | 9/2010 | Falk et al. | |
| 2010/0293379 | A1 | 11/2010 | Nie | |
| 2011/0191252 | A1 * | 8/2011 | Dai | 705/71 |
| 2011/0208970 | A1 | 8/2011 | Brown et al. | |
| 2012/0011362 | A1 | 1/2012 | Lambert | |
| 2012/0027201 | A1 | 2/2012 | Fujisaki et al. | |
| 2012/0131322 | A1 | 5/2012 | Smith et al. | |

(Continued)

OTHER PUBLICATIONS

Author Unknown, X9.63/2011 "Public Key Crytography for the Financial Services Industry: Key Agreement and Key Transport Using Elliptic Curve Cryptography", published in Dec. 2011, published by the American National Standard for Financial Services ASC X9, published in the U.S. , 155 pages (including the title page and introductory pp. I through xi).

(Continued)

*Primary Examiner* — Joseph P Hirl
*Assistant Examiner* — John B King
(74) *Attorney, Agent, or Firm* — Oblon, Spivak, McClelland, Maier & Neustadt, L.L.P.

(57) ABSTRACT

There are disclosed systems and methods for authenticating a mobile device by a network and/or for generating one or more keys that can be used for securely transmitting data between the mobile device and the network. In one embodiment, the following operations are performed by a mobile device: (i) the mobile device participates in at least a portion of a key agreement protocol with a network to compute a secret value; (ii) the mobile device obtains a response value derived from the secret value; and (iii) the mobile device sends the response value to a verification entity for use in authenticating the mobile device. There are also disclosed systems and methods for authenticating a network by a mobile device.

17 Claims, 12 Drawing Sheets

(56) References Cited

U.S. PATENT DOCUMENTS

2012/0297473 A1 11/2012 Case et al.
2013/0155948 A1 6/2013 Pinheiro et al.

OTHER PUBLICATIONS

Extended European Search Report issued Oct. 1, 2013 in European Patent Application No. 13173902.1.
"3rd Generation Partnership Project; Technical Specification Group Services and System Aspects; Rationale and track of security decisions in Long Term Evolved (LTE) RAN/3GPP System Architecture Evolution (SAE)(Release 8)", 3GPP Standard; 3GPP TR 33.821, 3rd Generation Partnership Project (3GPP), Mobile Competence Centre; 650, Route Des Lucioles; F-06921 Sophia-Antipolis Cedex; France, No. V1.0.0, Nov. 1, 2008, 136 pages.
"Digital cellular telecommunications system (Phase 2+); Universal Mobile Telecommunications System (UMTS); LTE; 3GPP System Architecture Evolution (SAE); Security Architecture (3GPP TS 33.401 version 10.2.0 Release 10)", Technical Specification, European Telecommunications Standards Institute (ETSI), 650, Route Des Lucioles; F-06921 Sophia-Antipolis; France; vol. 3GPP SA 3, No. V10.2.0, Oct. 1, 2011, 118 pages.
"Universal Mobile Telecommunications System (UMTS): LTE; 3G security; Security architecture (3GPP TS 33.102 version 10.0.0 Release 10)", ETSI TS 133 102 V10.0.0 (May 2011), Technical Specification, Sophia Antipolis Cedex, France, 73 pages.
"ZigBee Control your world; Zigbee Smart Energy Profile Specification", Document 07-5356-17, Section 5.3 of Annex C (pp. 130-135), ZigBee Profile: 0x0109, Revision 17, Version 1.1.1, Mar. 22, 2012, 352 pages.
Office Action issued Jul. 19, 2013 in U.S. Appl. No. 13/536,686, filed Jun. 28, 2012.
Mendez, Alfred J. et al., "Handbook of Applied Cryptography", CRC Press LLC, 1997, pp. 359-368, 497-499.
International Search Report mailed Nov. 8, 2013, in International Application No. PCT/US2013/047921, filed Jun. 26, 2013.
Written Opinion mailed Nov. 8, 2013, in International Application No. PCT/US2013/047921, filed Jun. 26, 2013.
Hai Huang, et al: "An ID-based Authenticated Key Exchange Protocol Based on Bilinear Diffie-Heilman Problem", International Association for Cryptologic Research, vol. 20081213:061843, Dec. 13, 2008, pp. 1-10, XP061003254, [retrieved on Dec. 13, 2008].
Sherman S.M. Chow, et al: "Strongly-Secure Identifty-based Key Agreement and Anonymous Extension", international Association for Cryptologic Research, vol. 20080103:075535, Jan. 3, 2008, pp. 1-24, XP061002545, [retrieved on Jan. 3, 2008].
Fengjiao Wang, et al.: "A New Provably Secure Authentication and Key Agreement Mechanism for SIP Using Certificateless Public-key Cryptography", International Association for Cryptologic Research, vol. 20070608:203632, Jun. 7, 2007, pp. 1-15, XP061002346, [retrieved on Jun. 7, 2007].
Author Unknown, ETSI TS 133 102 v3.5.0 (Jul. 2000) Technical Specficiation; Universal Mobile Telecommunications System (UMTS); 3G Security; Security Architecture (3G TS 33.102 version 3.5.0 Release 1999); Published in Jul. 2000; Published by ETSI, 650 Route des Lucioles F-06921 Sophia Antipolis Cedex—France; 60 pages.
Author Unknown, ETSI TS 133 105 v3.4.0 (Jul. 2000) Technical Specification; Universal Mobile Telecommunications System (UMTS); 3G Security; Cryptographic Algorithm Requirements (3G TS 33.105 version 3.4.0 Release 1999); Published in Jul. 2000; Published by ETSI, 650 Route des Lucioles F-06921 Sophia Antipolis Cedex—France; 27 pages.
Author Unknown, ETSI TS 135 205 v10.0.0 (Apr. 2011) Technical Specification; Universal Mobile Telecommunications System (UMTS); LTE; 3G Security; Specification of the Milenage algorithm set: An example algorithm set for the 3GPP authentication and key generation functions fl, f1*, f2, f3, f4, f5 and f5*; Document 1: General (3GPP TS 35.205 version 10.0.0 Release 10); Published in Apr. 2011; Published by ETSI, 650 Route des Lucioles F-06921 Sophia Antipolis Cedex—France; 17 pages.
Barker, Elaine et al., NIST Special Publication 800-56A, "Recommendation for Pair-Wise Key Establishment Schemes Using Discrete Logarithm Cryptography (Revised)", Computer Security, National Institute of Standards and Technology (NIST), Mar. 2007, 114 pages; published by NIST (city/country of publication unknown).
Office Action mailed Feb. 4, 2014, in co-pending U.S. Appl. No. 13/536,747, 13 pages.
Dworkin, Morris "Recommendation for Block Cipher Modes of Operation: The CMAC Mode for Authentication", NIST Special Publication 800-38B, Computer Security, Computer Security Division, Information Technology Laboratory, National Institute of Standards and Technology Gaithersburg, MD 20899-8930 May 2005, 24 pages.
Menezes, Alfred J. et al. "Handbook of Applied Cryptography", 1997, Chapter 9, pp. 321-383, CRC Press LLC, USA.
Menezes, Alfred J. et al. "Handbook of Applied Cryptography", 1997, Chapter 12, pp. 489-541, CRC Press LLC, USA.
"The Keyed-Hash Message Authentication Code (HMAC)", Federal Information Processing Standards Publication, FIPS PUB 198-1, Category: Computer Security; Subcategory: Cryptography, Information Technology Laboratory, National Institute of Standards and Technology, Gaithersburg, MD 20899-8900 Jul. 2008, 13 pages.
Chen, Lily "Recommendation for Key Derivation Using Pseudorandom Functions (Revised)", NIST Special Publication 800-108, Computer Security Division, Information Technology Laboratory, Oct. 2009, 21 pages.
Office Action mailed Jan. 6, 2014, in co-pending U.S. Appl. No. 13/536,686, 17 pages.
Office Action mailed Aug. 8, 2014, in co-pending U.S. Appl. No. 13/536,747, 12 pages.

* cited by examiner

AUTHENTICATION OF A MOBILE DEVICE BY A NETWORK AND KEY GENERATION

FIELD

The following relates to the authentication of a device by a network and the generation of at least one key for securing data communications to/from the device.

BACKGROUND

When a mobile device roams and initiates communication with a visited network, it is often necessary to perform authentication to confirm that the mobile device is who it appears to be. The mobile device may also wish to perform authentication to confirm that the visited or home network is who it appears to be. Assuming authentication is successful, it is also often necessary to establish one or more keys that can be used for securely transmitting data to/from the mobile device.

The 3rd Generation Partnership Project (3GPP) document *ETSI TS* 133 102 *v*3.5.0, "*Universal Mobile Telecommunications Systems* (*UMTS*); 3*G Security; Security Architecture*", 3*G TS* 33.102 *version* 3.5.0 *Release* 1999, defines one mechanism for performing such authentication and key generation in a 3GPP system.

In this 3GPP document, the specific cryptographic functions used to perform the authentication and the key generation are not standardized. Rather, in this 3GPP document, as well as in the related 3GPP document *ETSI TS* 133 105 *v*3.4.0, "*Universal Mobile Telecommunications Systems* (*UMTS*); 3*G Security; Cryptographic Algorithm Requirements*", 3*G TS* 33.105 *version* 3.4.0 *Release* 1999, the inputs and outputs to the cryptographic functions are specified, as well as the generic requirements for such functions (e.g. their resilience to attacks and restrictions on their use).

Therefore, in a system that conforms to the 3GPP documents discussed above, an operator may design his or her own cryptographic functions for the authentication and key generation, as long as they conform to the requirements of these (and any other pertinent) 3GPP documents. Currently, however, it is common practice for many operators to use the example cryptographic functions outlined in the 3GPP document *ETSI TS* 135 205 *v.*10.0.0 "*Universal Mobile Telecommunications Systems* (*UMTS*); *LTE;* 3*G Security; Specification of the MILENAGE algorithm set: An example algorithm set for the* 3*GPP authentication and key generation functions f*1, *f*1*, *f*2, *f*3, *f*4, *f*5 *and f*5* *Document* 1: *General*", 3*GPP TS* 35.205 *version* 10.0.0 *Release* 10.

Aside from systems that deploy 3GPP, in many mobile communication systems it is generally desired for a network to perform authentication to confirm that the mobile device is who it appears to be, and to possibly generate one or more keys for securing communication to/from the mobile device.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
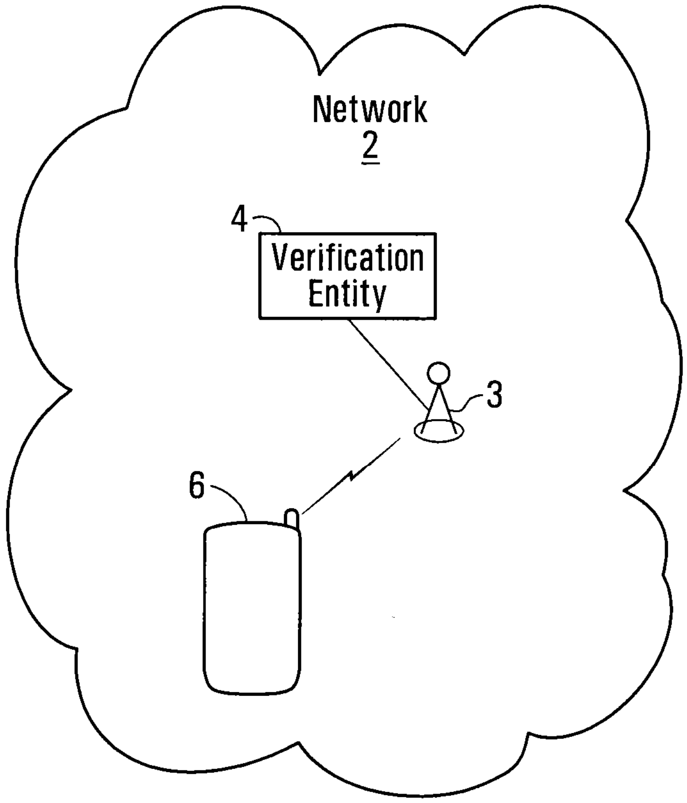
FIG. 1 illustrates an example of a network having a verification entity.

In general, there are disclosed systems and methods for authenticating a mobile device by a network and/or for generating one or more keys that can be used for securely transmitting data between the mobile device and the network. There are also disclosed systems and methods for authenticating a network by a mobile device.

In one embodiment, from the perspective of the mobile device, the following operations are performed: the mobile device participates in at least a portion of a key agreement protocol with a network to compute a secret value; the mobile device obtains a response value derived from the secret value; the mobile device sends the response value to a verification entity for use in authenticating the mobile device.

In another embodiment, from the perspective of the network, the following operations are performed: the network participates in at least a portion of a key agreement protocol with a mobile device to compute a secret value; the network obtains an expected response value derived from the secret value; the network sends the expected response value to a verification entity for use in authenticating the mobile device.

The secret value computed by the network during the key agreement protocol corresponds to the secret value computed by the mobile device during the key agreement protocol, such that, at the end of the key agreement protocol, assuming it was executed properly and one of the parties is not an imposter, the secret value computed by each of the mobile device and the network is the same and is therefore shared between the network and the mobile device.

In another embodiment, from the perspective of the verification entity, the following operations are performed: the verification entity obtains an expected response value from the network and a response value from the mobile device, the expected response value having been derived by the network from a secret value computed as part of at least a portion of a key agreement protocol with the mobile device, and the response value having been derived by the mobile device from a secret value computed as part of at least a portion of a key agreement protocol with the network. The verification entity then authenticates the mobile device by confirming that the expected response value matches (is equivalent to or is equal to) the response value.

The secret value respectively computed by and therefore shared between the network and the mobile device as part of the key agreement protocol can also or instead be used to generate one or more keys for securing communication between the mobile device and a network (either the same network with which the mobile device participates in the key agreement protocol, or another network). Therefore, in another embodiment, from the perspective of the mobile device, the following operations are performed: the mobile device participates in at least a portion of a key agreement protocol with a network to compute a secret value; the mobile device then obtains a key derived from the secret value. In another embodiment, from the perspective of the network, the following operations are performed: the network participates in at least a portion of a key agreement protocol with a mobile device to compute a secret value; the network then obtains a key derived from the secret value.

In another embodiment, from the perspective of the mobile device, the following operations are performed: the mobile device participates in at least a portion of a key agreement protocol with a network to compute a secret value; the mobile device obtains an expected response value derived from the secret value; the mobile device receives a response value originating from the network, and the mobile device authenticates the network by confirming that the expected response value matches (is equivalent to or is equal to) the response value.

The terms "response value" and "expected response value" are used herein. More generally, they may be referred to as a "first value" and a "second value" respectively. The terms "response" and "expected response" have simply been employed to provide further clarity and context. They should not be considered limiting in any way. For illustrative purposes, some specific example embodiments will now be explained in greater detail below in conjunction with the figures.

The embodiments set forth herein represent the necessary information to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a computer/processor readable storage medium or media for storage of information, such as computer/processor readable instructions, data structures, program modules, or other data. A non-exhaustive list of examples of computer/processor readable storage media include magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such computer/processor storage media may be part of a device or accessible or connectable thereto. Any application or module herein described may be implemented using computer/processor readable/executable instructions that may be stored or otherwise held by such computer/processor readable storage media.

Referring first to FIG. 1, a network 2 is illustrated having a verification device or entity 4. In the illustrated embodiment, the verification entity 4 is or forms part of a physical piece of equipment or hardware in the network 2. The verification entity 4 may be located anywhere in the network 2. For example, the verification entity may be part of a particular base station (or Node B), a base station controller (or radio network controller), a mobile switching center (MSC), a serving GPRS support node (SGSN), a home location register (HLR), a visitors location register (VLR), or an authentication center (AuC).

A mobile device 6 enters the network 2 and initiates communication with the network 2. The mobile device 6 may communicate directly with the verification entity 4 of the network 2, or it may communicate indirectly with the verification entity 4 through a base station 3 (as illustrated), or through the base station 3 and other physical components of the network not shown, such as a radio network controller (RNC) and a MSC, VLR, or an SGSN.

Figure 2:
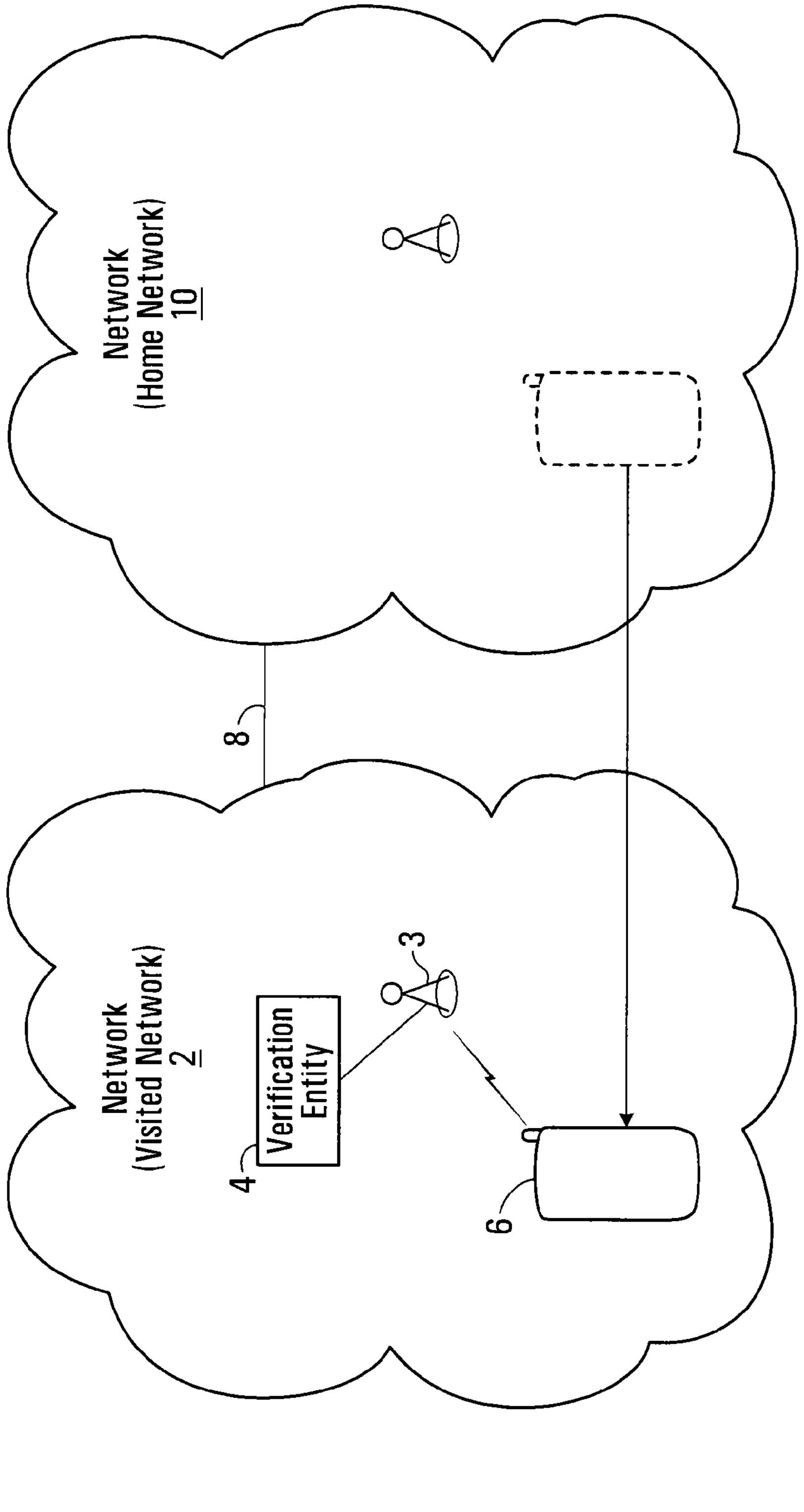
FIG. 2 illustrates the example scenario in which the network of FIG. 1 is a visited network.

In general, the network 2 may be a home network of the mobile device 6, or it may be a visited network. FIG. 2 illustrates a scenario in which the network 2 is a visited network and there exists a communication link 8 between the visited network and a home network 10 of the mobile device 6, which allows the verification entity 4 to communicate with the home network 10.

Figure 3:
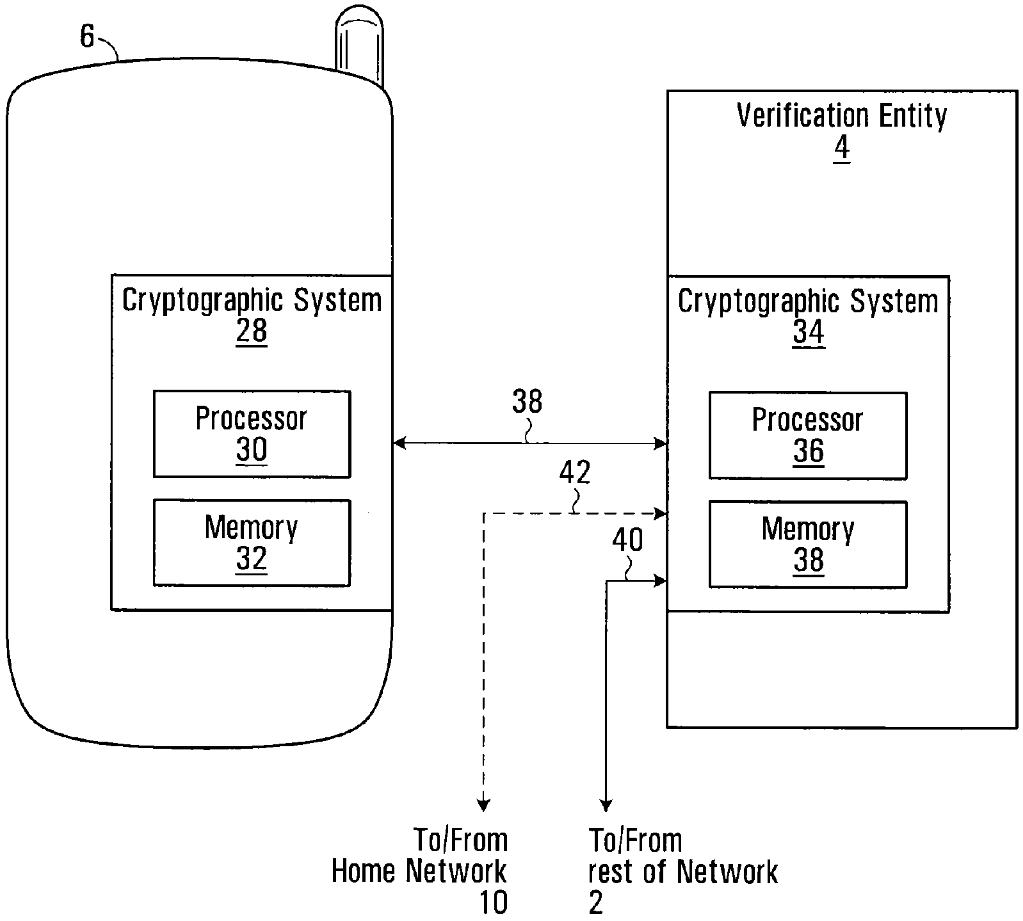
FIG. 3 is a block diagram of an embodiment of a verification entity and a mobile device.

An example of the mobile device 6 and the verification entity 4 is illustrated in FIG. 3. The mobile device 6 implements a cryptographic system 28 comprising a processor 30 and a memory 32. As will be explained later, in one embodiment, the mobile device 6 comprises a universal integrated circuit card (UICC) that implements (at least in part) the cryptographic system 28. The verification entity 4 also implements a cryptographic system 34 comprising a processor 36 and a memory 38. Only a single processor 30 is shown on the device 6, and only a single processor 36 is shown at the verification entity 4. However, it will be appreciated that when implemented in practice, more than one processor may be used.

Each cryptographic system 28 and 34 implements one or more cryptographic protocols to perform authentication and/or to generate keys for securing data communication, such as the protocols described herein. The cryptographic operations performed by the processors of the cryptographic systems (processors 30 and 36) typically include arithmetic operations on data strings (such as bit strings) representing parameters, values, integers, messages, or data in the protocols to produce data strings representing the output of the protocols.

A communication link 38 is illustrated between each of cryptographic systems 28 and 34 in order to indicate (in a simplified manner) that these systems can exchange data via the communication path between the mobile device 6 and the verification entity 4.

The verification entity 4 is also able to communicate with the rest of its network (network 2), as shown via link 40. In the scenario of FIG. 2 in which the network 2 is a visited network for the mobile device 6, the verification entity 4 is also able to communicate with the home network 10, as shown via link 42. The link 40 and link 42 are illustrated as separate communication links, but it will be appreciated that in some embodiments these links could be the same (or part of the same) physical link.

Figure 4:
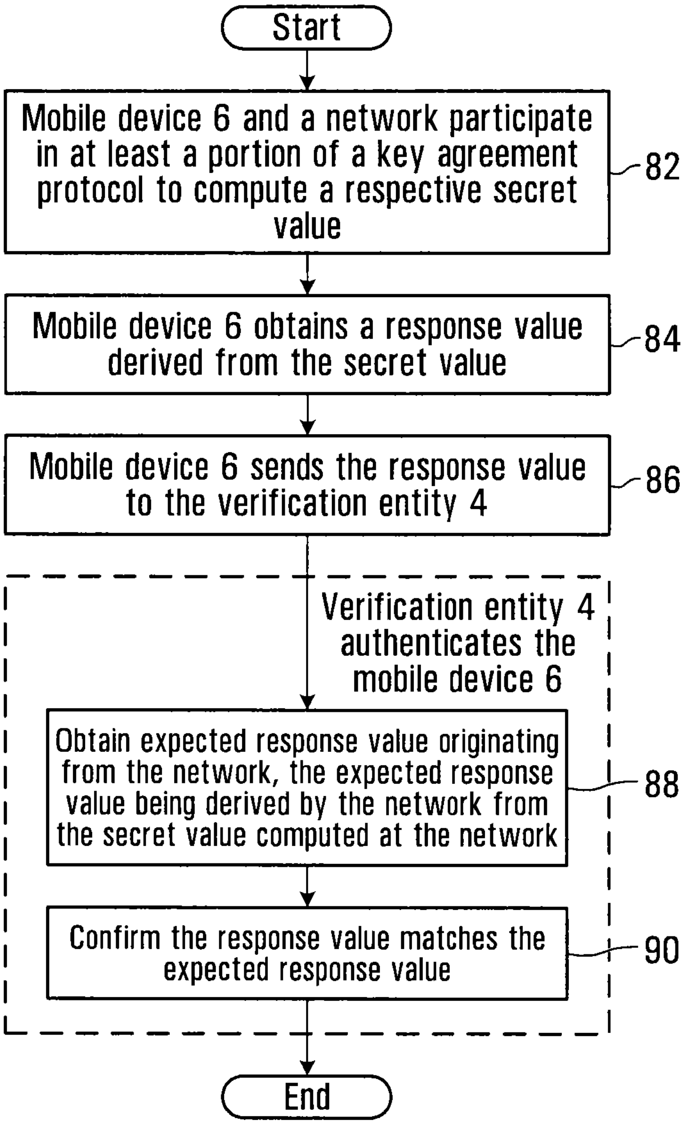
FIG. 4 is a flow diagram of a method of authenticating a mobile device.

In one embodiment, the verification entity 4 wishes to authenticate the mobile device 6. This may be in response to a request from the mobile device 6. In order to achieve this, the method of FIG. 4 is performed.

First, in step 82, the mobile device 6 and the network participate in at least a portion of a key agreement protocol to each compute a respective secret value. This respective secret value is a shared secret value. By "shared" secret value it is meant that it is (or should be if correctly performed by authentic entities) the same secret value respectively computed by both the mobile device and the network as part of the key agreement protocol, such that it is shared between them. That is, although the secret values are respectively computed by the mobile device and the network, these secret values correspond with each other in that they are the same or equivalent and therefore shared. That being said, there may be rare instances in which the respective secret value (i.e. the intended shared secret value) may not be the same value computed at each of the mobile device and the network if, for example, there is an error, or if an imposter is unsuccessfully posing as the mobile device or the network. In these instances, the authentication described below in step 90 is designed to fail.

After the secret value is computed in step 82, next in step 84 the mobile device 6 obtains a response value derived from the secret value computed at the mobile device in step 82.

Then, in step 86, the mobile device 6 sends this response value to the verification entity 4.

In step 88, the response value is used by the verification entity 4 in authenticating the mobile device 6. Specifically, the verification entity 4 compares the response value to an expected response value originating from the network. The expected response value is derived by the network from the secret value computed at the network as part of the key agreement protocol.

In step 90, if the response value matches the expected response value, then the verification entity 4 accepts this as an indication that the mobile device 6 has been authenticated.

In the method of FIG. 4, the network may be either the network 2 or the network 10. For example, consider first the scenario of FIG. 1. In this scenario the network 2 performs the key agreement protocol with the mobile device 6 such that the network 2 and the mobile device 6 each compute a respective secret value shared with each other. The processors 30 and 36 may perform the computations of the key agreement protocol on the mobile device 6 and in the network 2 respectively. Alternatively, in the scenario of FIG. 2, the home network 10 may instead perform the key agreement protocol with the mobile device 6, exchanging any parameters as necessary through the network 2, such that the home network 10 and the mobile device 6 each compute a respective secret value shared with each other. In the scenario of FIG. 2 as applied to the method of FIG. 4, the authentication performed by the verification entity 4 verifies that a secret value has been computed by and is shared between each of the mobile device 6 and the home network 10 by verifying that the expected response value matches the response value in step 90. An example implementation of this scenario will be described in more detail later in relation to FIGS. 6 to 10.

In some embodiments, the cryptographic operations in the method of FIG. 4 are performed using non-elliptic-curve finite field cryptography (FFC), while in other embodiments the cryptographic operations are performed using elliptic curve cryptography (ECC). As an example, such cryptographic operations may include those specified in *X*9.63-2011, *Public Key Cryptography for the Financial Services Industry—Key Agreement and Key Transport Using Elliptic Curve Cryptography and/or NIST Special Publication* 800-56*A, Recommendation for Pair-Wise Key Establishment Schemes Using Discrete Logarithm Cryptography,* March 2007, both incorporated herein by reference.

In the method described in FIG. 4, any known key agreement protocol can be used to generate the secret value shared by the mobile device 6 and the network (network 2 or network 10). In some embodiments, the mobile device 6 and the network each compute the shared secret value during the key agreement protocol by using at least one parameter received from the other. In such embodiments, this parameter may be a public parameter, such as a public key (e.g. a static and/or ephemeral public key). Examples of such key agreement protocols include the Diffie-Hellman key agreement protocol and the Menezes-Qu-Vanstone (MQV) key agreement protocol.

In some embodiments, the key agreement protocol in FIG. 4 (and described herein generally) is an asymmetric key agreement protocol. An asymmetric key agreement protocol is a key agreement protocol that utilizes one or more asymmetric keys, i.e., one or more private and/or public keys, to agree upon a shared symmetric key. This differs from what some might call a "symmetric key agreement protocol" in which a shared symmetric key is derived from one or more previously shared symmetric values, such as a previously shared symmetric key. Examples of asymmetric key agreement protocols include the Diffie-Hellman key agreement protocol and the MQV key agreement protocol.

Assuming the key agreement protocol is an MQV key agreement protocol, there are different ways in which the MQV key agreement protocol can be performed in order to compute the shared secret between the network and the mobile device 6. For example, in some embodiments, the mobile device 6 has a previously-generated key pair ($d_S$,$Q_S$), where $d_S$ is a private key and $Q_S$ is a corresponding public key related to the private key $d_S$ by a mathematical function. The mathematical function presents a "difficult" mathematical problem to ensure that the private key $d_S$ of the mobile device 6 cannot be obtained from the corresponding public key $Q_S$ without an unrealistic assumption of computational complexity. An example of one such problem is the discrete logarithm problem over a finite field. The private/public key pair ($d_S$,$Q_S$) may be stored in the memory 32 of the mobile device 6. The network (network 2 or network 10) also has a previously-generated private/public key pair ($d_H$,$Q_H$). The public key of the network $Q_H$ is previously provided to the mobile device 6, and the public key of the mobile device $Q_S$ is previously provided to network. An MQV primitive function can then be executed by each of the mobile device 6 and the network to each compute the shared secret value. For example, an MQV function such as the MQV primitive specified in Section 5.7.2 of *NIST Special Publication* 800-56*A, Recommendation for Pair-Wise Key Establishment Schemes Using Discrete Logarithm Cryptography,* March 2007, incorporated herein by reference, may be used. This MQV primitive accepts as input keys (a,b,B,C,D), and outputs a shared secret value Z, i.e., Z=MQV(a,b,B,C,D) where typically:

a is the static private key of the device;

b is the second private key of the device;

B is the second public key of the device;

C is the static public key of the other device with which the shared secret is being shared; and D is the second public key of the other device with which the shared secret is being shared.

The "second" keys referred to above (b, B, and D) are typically ephemeral keys, although strictly speaking they do not have to be.

The mobile device 6 can use its private key $d_S$ as the input a, and can use the public key of the network $Q_H$ as the input C. The mobile device 6 can generate its own ephemeral key pair ($b=k_S$,$B=G_S$) as part of the key agreement protocol and use this as an input to the MQV primitive, or in other embodiments (such as in the example embodiment described later), the mobile device 6 can use its private/public key pair ($d_S$,$Q_S$) as input (b,B). Input D is a public key from the network. Taking into consideration the above, in such embodiments, the mobile device 6 can compute the shared secret value Z as:

$$Z=\mathrm{MQV}(d_S,d_S,Q_S,Q_H,G_H) \text{ or } \quad (1)$$

$$Z=\mathrm{MQV}(d_S,k_S,G_S,Q_H,G_H) \text{ or } \quad (2)$$

$$Z=\mathrm{MQV}(d_S,k_S,G_S,Q_H,Q_H), \text{ where } \quad (3)$$

$d_S$, $Q_S$, and $Q_H$ have been defined above, ($k_S$,$G_S$) is an ephemeral key pair that may be generated by the mobile device 6 as part of the key agreement protocol, and where $G_H$ is an ephemeral public key of the network that may be generated as part of the key agreement protocol and sent to the mobile device 6 (e.g. via verification entity 4).

In each case, then the network respectively performs the complementary operation to obtain its respective secret value:

$$Z=\mathrm{MQV}(d_H,k_H,G_H,Q_S,Q_S) \text{ or } \quad (1)$$

$$Z=\mathrm{MQV}(d_H,k_H,G_H,Q_S,G_S) \text{ or } \quad (2)$$

$$Z=\mathrm{MQV}(d_S,d_H,Q_H,Q_S,G_S), \text{ where } \quad (3)$$

$k_H$ is an ephemeral private key of the network corresponding to $G_H$ that may be generated by the network as part of the key agreement protocol, and where the other parameters have been defined above.

In the example implementation described later with respect to FIGS. 6 to 10, an MQV primitive using the inputs shown in (1) is used.

Returning back to FIG. 4, in step 84 the mobile device 6 obtains a response value derived from the shared secret value computed at the mobile device in step 82. In one embodiment this may be achieved by the mobile device 6 computing a key derivation function that accepts as an input the secret value, and outputs a value from which the response value can be obtained. The key derivation function may optionally accept as part of its input other parameters, such as (but not limited to): a parameter relating to the length of the string output by the key derivation function, and/or data relating to at least one of a wireless carrier, an identity of the mobile device, an identification of the method being used to generate the response value, and additional information known a priori to both the mobile device 6 and the network.

Similarly, the network obtains an expected response value derived from the shared secret value computed at the network. The same key derivation function is used to compute the expected response value as that used by the mobile device 6 to compute the response value so that (assuming the mobile and network are authentic entities correctly performing the protocol) the expected response value equals the response value. The expected response value is sent from the network to the verification device and is used for authentication as per step 90 of FIG. 4. Examples of key derivations functions include (but are not limited to):

(1) the ANSI X9.63 hash-based KDF using SHA-256, as specified in *X*9.63-2011, *Public Key Cryptography for the Financial Services Industry—Key Agreement and Key Transport Using Elliptic Curve Cryptography,* and (2) the NIST SP800-56A hash-based KDF using SHA-256 as specified in Section 5.8.1 of *NIST Special Publication* 800-56*A, Recommendation for Pair-Wise Key Establishment Schemes Using Discrete Logarithm Cryptography,* March 2007.

Other key derivation functions are also known and may instead be used.

The method of FIG. 4 can optionally include the generation of one or more keys for securing communication between the network 2 and the mobile device 6. These optional steps are not illustrated in FIG. 4, but are discussed in the two paragraphs below.

The mobile device 6 and the network (network 2 or network 10) may derive one or more shared secret keys from the shared secret value computed in step 82. These keys may then be used to secure communications between the mobile device 6 and the network 2. Note that if the mobile device 6 and the network 10 are performing the key agreement (as in the FIG. 2 scenario), then these keys may be securely transmitted from the network 10 to the network 2 over communication link 8.

In some embodiments, one or more keys may be obtained by the mobile device 6 and the network by using the shared secret as an input to a key derivation function, such as one of the two key derivation functions mentioned above. Other information may also be provided as an input to the key derivation function in order to tie the generated key(s) to said other information. Examples of such other information include (but are not limited to): a sequence number, and/or an authentication management field, and/or data relating to at least one of a wireless carrier, an identity of the mobile device, an identification of the method being used to generate the keys, and additional information known a priori to both the mobile device 6 and the network. A parameter relating to the length of the string output by the key derivation function may also be provided as an input to the key derivation function. Both the mobile device 6 and the network use the same key derivation function(s) with the same inputs in order to generate the same secret key(s).

In some embodiments, this optional key generation step described in the two paragraphs above is performed instead of authentication steps 84 to 90 of FIG. 4, for example, if authentication is not required or is otherwise implicit through another operation. However, in general, and in the embodiments described in detail herein, the key generation step, when implemented, occurs alongside the authentication. Notably, this can be more easily implemented because both the authentication and the key generation use the secret value computed in the key agreement protocol in step 82 of FIG. 4.

One benefit of the method of FIG. 4 is that the network and the mobile device 6 do not necessarily need to preserve both the confidentiality and data-integrity of a secret symmetric key K as the mobile device roams. Rather, a shared secret value can be generated using the key agreement protocol (step 82 of FIG. 4), and the shared secret value can then be used by each of the mobile device and the network for authentication purposes and for generation of a symmetric key for securing data communication. This and other benefits are discussed in more detail below in the context of one specific example implementation described with respect to FIGS. 6 to 10.

In some embodiments, the method of FIG. 4 may additionally or instead include the mobile device 6 authenticating the network. In such embodiments, the mobile device 6 uses the shared secret value it computed to generate an expected response value. The mobile device 6 then receives a response value originating from the network. The response value is computed by the network using the shared secret value computed by the network. The mobile device 6 then confirms that the response value from the network matches (i.e. is equivalent or equal to) its expected response value.

Returning now to FIG. 3, it is important to clarify some of the hardware discussed in relation to embodiments described herein. Although not explicitly illustrated in FIG. 3, the mobile device 6 may include a Universal Integrated Circuit Card (UICC), either embedded into the mobile device 6 (an embedded UICC or "eUICC"), or inserted into the mobile device 6. In such embodiments, the cryptographic system 28 of the mobile device 6 is implemented using at least in part the UICC (or embedded UICC). The UICC may execute a USIM application to perform cryptographic protocols such as those described herein. In some embodiments, the processor 30 is part of the UICC. However, this need not necessarily be the case. For example, the processor 30 could instead be part of the mobile device 6. In particular, if the UICC is an embedded UICC, the exact boundaries between the UICC and the rest of the mobile device 6 may be blurred, and the embedded UICC may be considered one with the mobile device 6 itself. The details relating to whether a UICC exists and whether the operations described herein are performed only on the UICC, only on the mobile device, or by a combination of both is or could be implementation specific. Thus, in general terms, in the methods described herein, the operations and computations performed on the mobile side can be implemented by either the mobile device 6 itself, the UICC only (which would control the mobile device to transmit and receive data as necessary), or both the mobile device 6 and the UICC.

Figure 5:
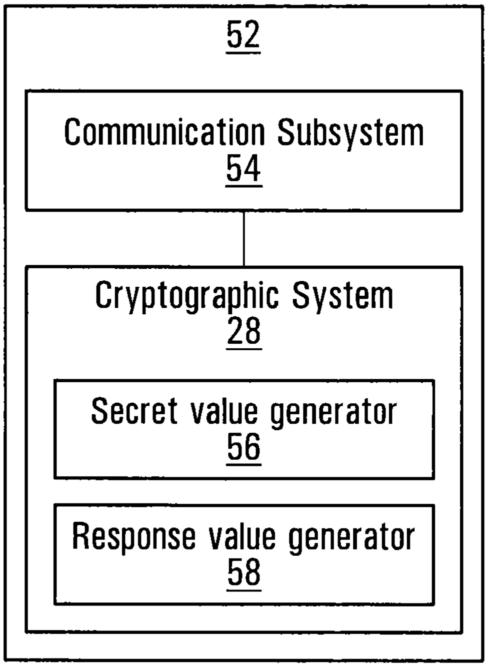
FIG. 5 is a block diagram of an embodiment of an apparatus for implementing a cryptographic system.

With the paragraph above in mind, there is illustrated in FIG. 5 more generally an embodiment of an apparatus 52 for implementing the cryptographic system 28 on the mobile side. The apparatus includes the cryptographic system 28 and a communication subsystem 54. The communication subsystem 54 includes the necessary hardware known in the art for implementing wireless communication with a network, such as a transmitter, receiver, antenna, and digital processors. The communication subsystem 54 is used to transmit data between the apparatus 52 and the network 2. The cryptographic system 28 includes a secret value generator 56 for generating the shared secret value via the key agreement protocol in step 82 of FIG. 4. The cryptographic system 28 also includes a response value generator 58 for generating the response value in step 84 of FIG. 4. The secret value generator 56 and response value generator 58 may be implemented using the processor 30 and memory 32 shown in FIG. 3. In some embodiments, the apparatus 52 comprises a mobile device and a UICC. In such embodiments, the UICC can be either embedded within the mobile device or insertable into the mobile device. In one such embodiment, the UICC implements some or all of the cryptographic operations required in the key agreement protocol and required in generating the response value, and then instructs or controls the mobile device to communicate with the network (to send and receive required data and parameters) using the communication subsystem 54.

Turning now to FIGS. 6 to 10, a specific example implementation will now be described in detail below in the context of the calling interface described in the 3GPP document *ETSI TS* 133 102 *v*3.5.0, "*Universal Mobile Telecommunications Systems* (*UMTS*); 3*G Security; Security Architecture*", 3*G TS* 33.102 *version* 3.5.0 *Release* 1999, which is incorporated herein by reference.

Figure 6:
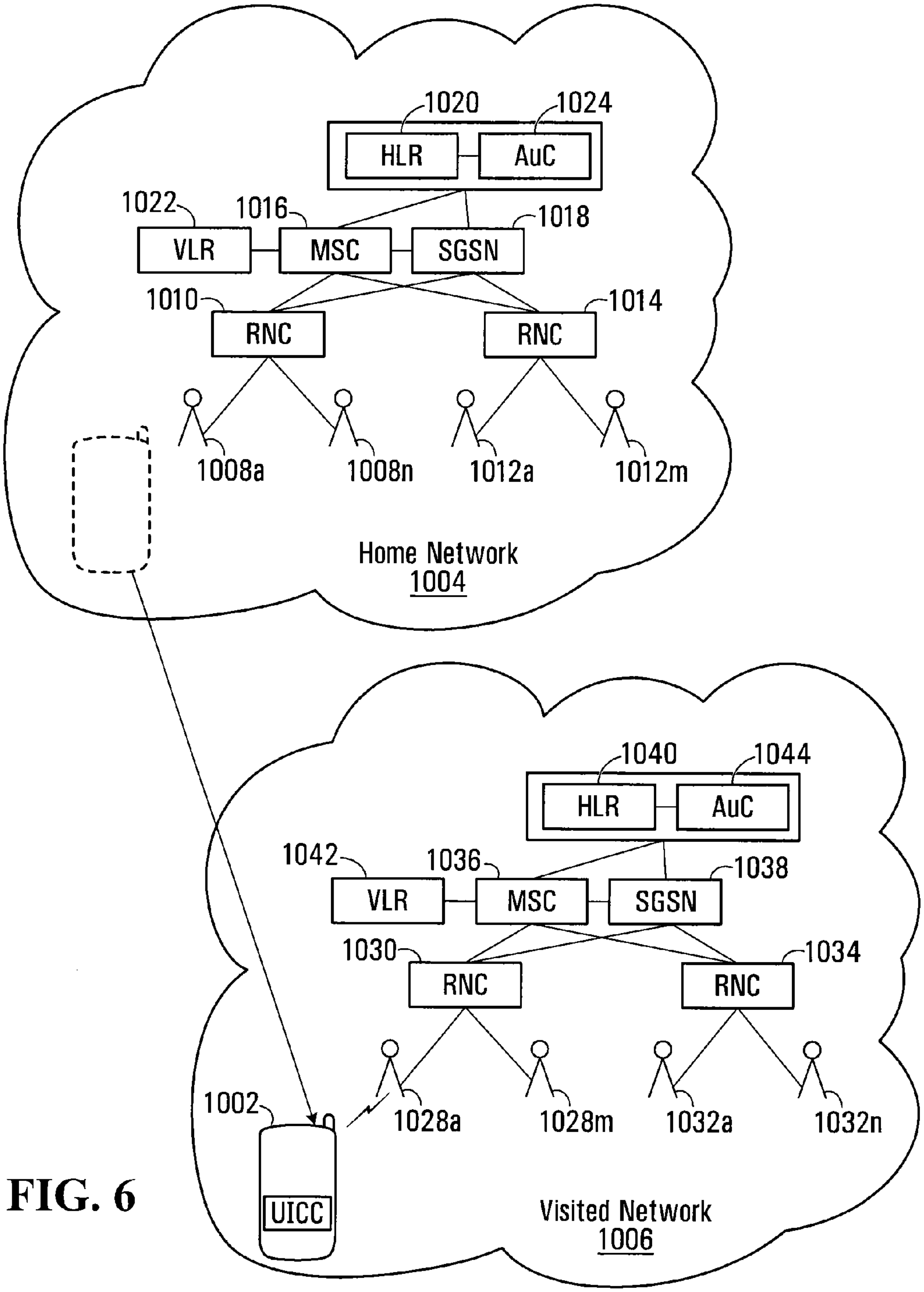
FIG. 6 illustrates another example of a home network and a visited network.

Turning therefore to FIG. 6, an embodiment of a home network 1004 of a roaming mobile device 1002 is illustrated. Also illustrated is an embodiment of a visited network 1006 that the mobile device 1002 is visiting. The components of the home network 1004 include Node Bs 1008*a* to 1008*n* controlled by a radio network controller (RNC) 1010, and Node B's 1012*a* to 1012*m*, controlled by a radio network controller (RNC) 1014. Other RNCs controlling other groups of Node Bs are also present, but have been omitted for the sake of clarity.

Each one of RNC 1010 and RNC 1014 is connected to both a mobile switching center (MSC) 1016 and a serving GPRS support node (SGSN) 1018. The MSC 1016 connects to an external circuit-switched network, such as the public switched telephone network (PSTN), and the SGSN 1018 connects to an external packet-switched network, such as the Internet. These external networks are not illustrated for the sake of clarity.

The MSC 1016 and the SGSN 1018 each have access to a home location register (HLR) 1020 and an authentication center (AuC) 1024. The MSC 1016 further has access to a visitors location register (VLR) 1022. The HLR 1020 includes a list of all users subscribed to the home network 1004, including mobile station 1002. The VLR 1022 includes a time varying list of all users who have roamed into the coverage area of the home network 1004, and the AuC 1024 is for handling the authentication and encryption keys for subscribers in the HLR 1020 and the VLR 1022. Although the VLR 1022 is illustrated as being separate from the MSC 1016 in FIG. 6, in alternative embodiments it may instead by part of the MSC 1016. Similarly, although the AuC 1024 is illustrated as being separate from the HLR 1020 (for example, both within a home subscriber server (HSS)), in alternative embodiments it may instead by part of the HLR 1020.

The components of the visited network 1006 include Node Bs 1028*a* to 1028*m* controlled by a radio network controller (RNC) 1030, and Node Bs 1032*a* to 1032*n*, controlled by a radio network controller (RNC) 1034. Other RNCs controlling other groups of Node Bs are also present, but have been omitted for the sake of clarity.

Each one of RNC 1030 and RNC 1034 is connected to both a mobile switching center (MSC) 1036 and a serving GPRS support node (SGSN) 1038. The MSC 1036 and the SGSN 1038 each have access to a home location register (HLR) 1040 and an authentication center (AuC) 1044. The MSC 1036 further has access to a visitors location register (VLR) 1042. The HLR 1040 includes a list of all users subscribed to the visited network 1006. The VLR 1042 includes a time varying list of all users who have roamed into the coverage area of the visited network 1042 (such as mobile device 1002), and the AuC 1044 is for handling the authentication and encryption keys for subscribers in the HLR 1040 and the VLR 1042. Although the VLR 1042 is illustrated as being separate from the MSC 1036 in FIG. 6, in alternative embodiments it may instead by part of the MSC 1036. Similarly, although the AuC 1044 is illustrated as being separate from the HLR 1040 (for example, both within a home subscriber server (HSS)), in alternative embodiments it may instead by part of the HLR 1040.

It will be appreciated that the networks 1004 and 1006 shown in FIG. 6 have been simplified. These networks may include many other components, but such other components have been omitted for the sake of clarity.

Figure 7:
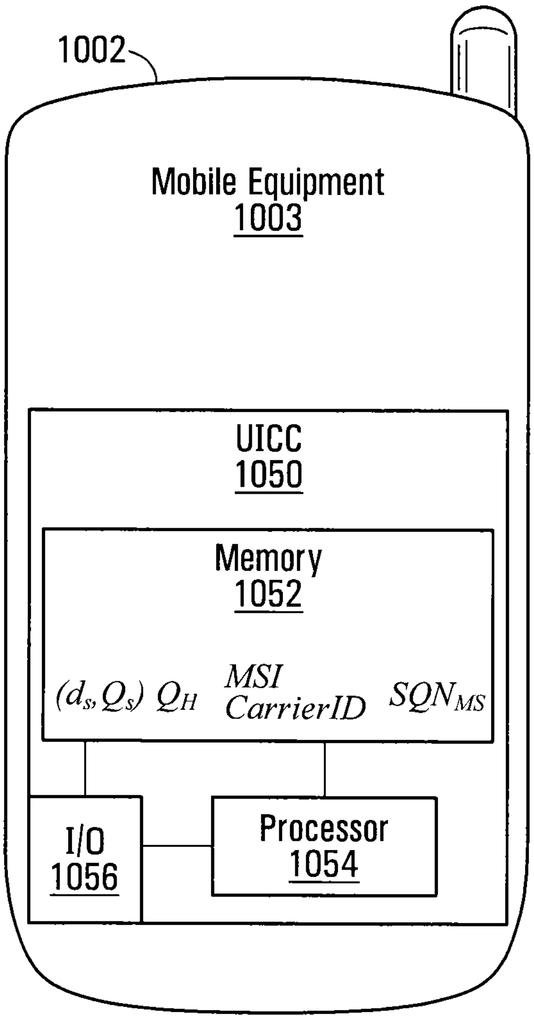
FIG. 7 is a block diagram of an embodiment of yet another mobile device.

The mobile device 1002 is illustrated in more detail in FIG. 7. The mobile device 1002 includes a universal integrated circuit cart (UICC) 1050, which in one embodiment is separable from the mobile device 1002, and in another embodiment may instead be embedded in the mobile device 1002 (i.e. an embedded-UICC or eUICC). The UICC 1050 includes a memory 1052, a processor 1054, and an input/output (I/O) interface 1056 for receiving data from and sending data to the mobile device 1002. The mobile device also includes mobile equipment 1003, which encompasses the portion of the mobile device 1002 that is not the UICC 1050.

The processor 1054 of the UICC 1050 implements one or more cryptographic protocols used to generate keys and authenticate data communication, such as the protocols described herein. The cryptographic operations performed by the processor 1054 in relation to these cryptographic protocols typically include arithmetic operations on data strings (such as bit strings) representing parameters, values, integers, messages, or data in the protocols to produce data strings representing the output from the protocols.

The memory 1052 is secure or includes a secure partition in which sensitive data is stored. Included in the memory 1052 is a previously-generated key pair ($d_S$,$Q_S$) of the mobile device 1002, where $d_S$ is a private key and $Q_S$ is a corresponding public key. The public key $Q_S$ of the mobile device 1002 is known by the AuC 1024 of the home network 1004. For example, it may have been previously distributed to the AuC 1024 through a known technique, such as via a certificate issued by a certification authority. Also included in the memory 1052 of the UICC 1050 is a public key $Q_H$ of a previously-generated private/public key pair ($d_H$,$Q_H$) of the AuC 1024.

A mobile subscriber identity (MSI) of the mobile device 1002 is also stored in the memory 1052 of the UICC 1050. This is the identity by which the mobile device 1002 is known. As used herein, MSI may refer to either a permanent international MSI (an IMSI) or a temporary MSI (a TMSI). A TMSI is described, for example, in *ETSI TS* 133 102 *v*3.5.0, "*Universal Mobile Telecommunications Systems* (*UMTS*); 3*G Security; Security Architecture", 3G TS* 33.102 *version* 3.5.0 *Release* 1999. Typically, the UICC 1050 always has an IMSI, and may generate a TMSI. In the protocol described in relation to FIGS. 6 to 10, the value "MSI" will be used in order to make it clear that it is not limited to having to be an IMSI or a TMSI.

Also stored in the memory 1052 of the UICC 1050 is a carrierID, which identifies the wireless carrier of the mobile device 1002.

Finally, a locally stored sequence number $SQN_{MS}$ is stored on the memory 1052, which is updated regularly (e.g. via a running counter) and is used as a "freshness" parameter so that values are modified if the method described below is repeated later by the same mobile device 1002 in the same visited network 1006.

Other parameters may also be stored on the memory 1052 of the UICC 1050, but have been omitted for the sake of clarity. Additionally, any other components of the UICC 1050 that may be present have been omitted for the sake of clarity.

Note that the illustrated embodiment shows and describes all of parameters ($d_S$,$Q_S$), $Q_H$, MSI, carrierID, and $SQN_{MS}$ stored on the memory 1052 of the UICC 1050. However, this is only one specific example implementation. It will be appreciated that in other embodiments some of these parameters may not be stored by or on the UICC 1050, but may be generated or received from outside the UICC 1050.

Figure 8:
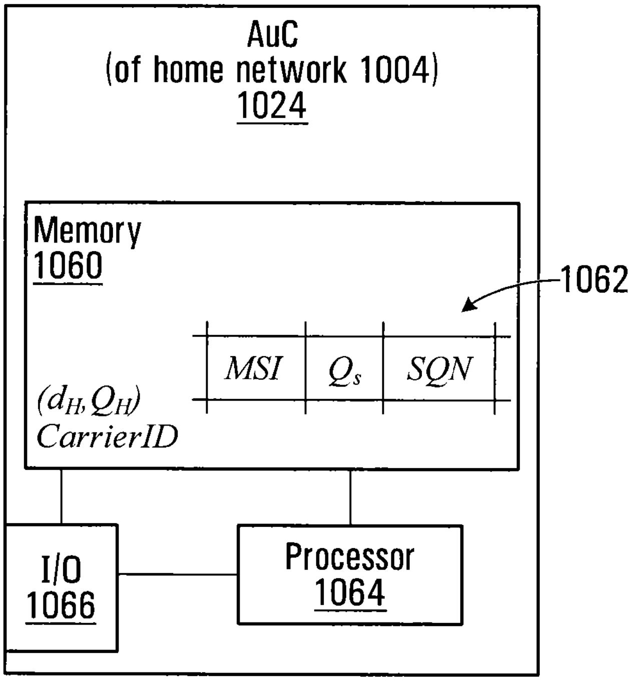
FIG. 8 is a block diagram of an embodiment of an authentication center.

The AuC 1024 of the home network 1024 is illustrated in greater detail in FIG. 8. The AuC 1024 includes a memory 1060, which is secure or includes a secure partition in which sensitive data is stored. Stored in the memory 1060 is the private/public key pair ($d_H$,$Q_H$) previously generated by the AuC 1024, as well as the carrierID mentioned above. Also stored in the memory 1060 is a lookup table 1062 in which MSI's of various mobile devices are stored, and in which various parameters and data are associated with each MSI. In the look up table 1062, the MSI of the mobile device 1002 has associated with it the public key $Q_S$ of the mobile device 1002 and a sequence number SQN, which (if synchronized) corresponds to $SQN_{MS}$. As mentioned above, the MSI may be an IMSI or a TMSI (or the AuC 1024 could have both). That being said, typically the AuC 1024 will have the IMSI of the mobile device 1002.

The illustrated embodiment shows and describes all of parameters ($d_H$,$Q_H$), $Q_S$, MSI, carrierID, and SQN stored on the memory 1060 of the AuC 1024. Once again, this is only one specific example implementation. It will be appreciated that in other embodiments some of these parameters may not be stored by or on the memory 1060, but may be generated or received from outside the AuC 1024.

The AuC 1024 also includes a processor 1064 that is configured to perform cryptographic operations, such as operations that implement one or more cryptographic protocols. The AuC 1024 also includes an input/output interface 1066 for receiving and sending parameters, data, and other information.

Figure 9A:
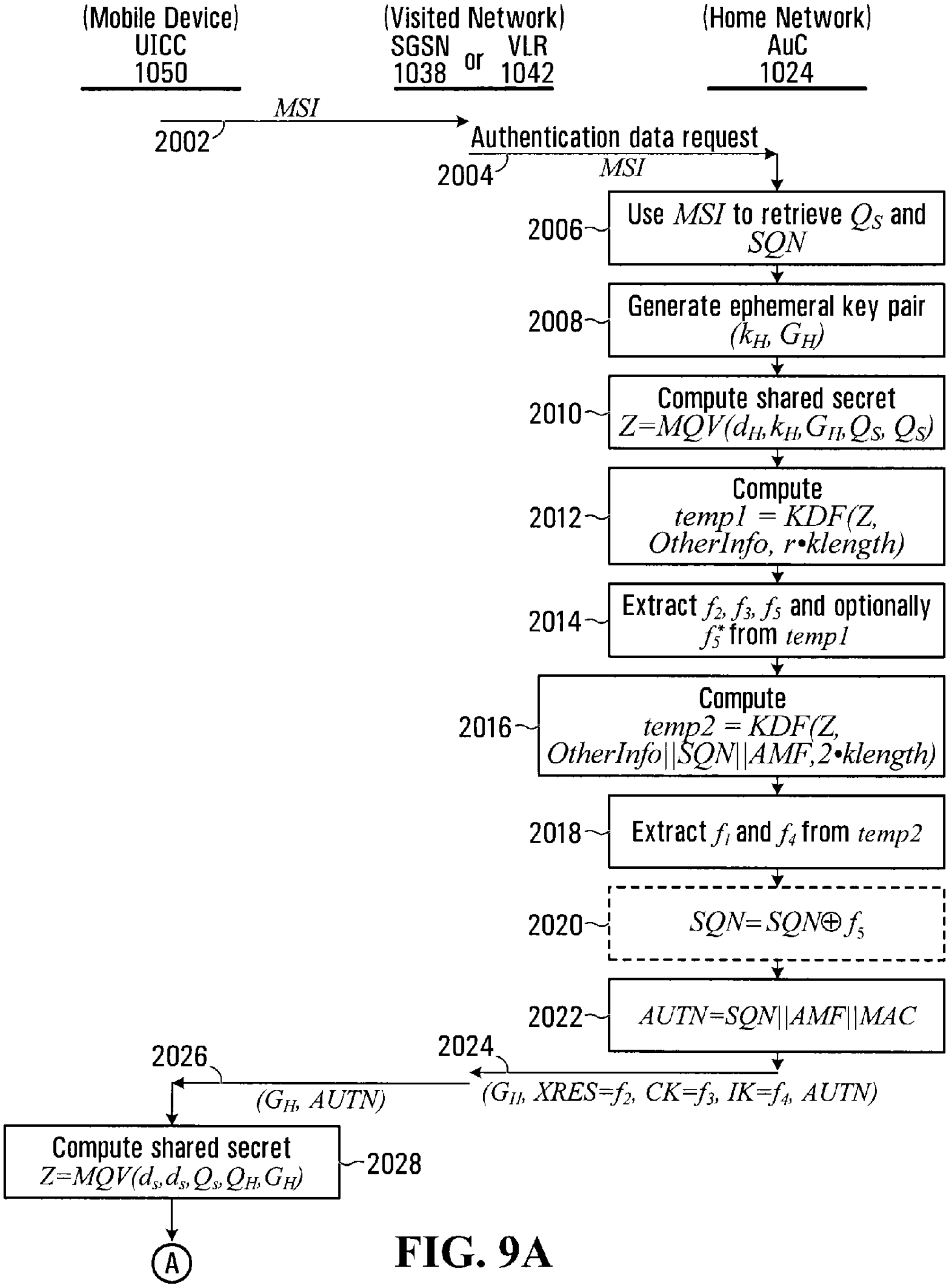
FIGS. 9A and 9B illustrate a flow diagram of an exemplary method of authenticating a mobile device and generating keys.
Figure 9B:
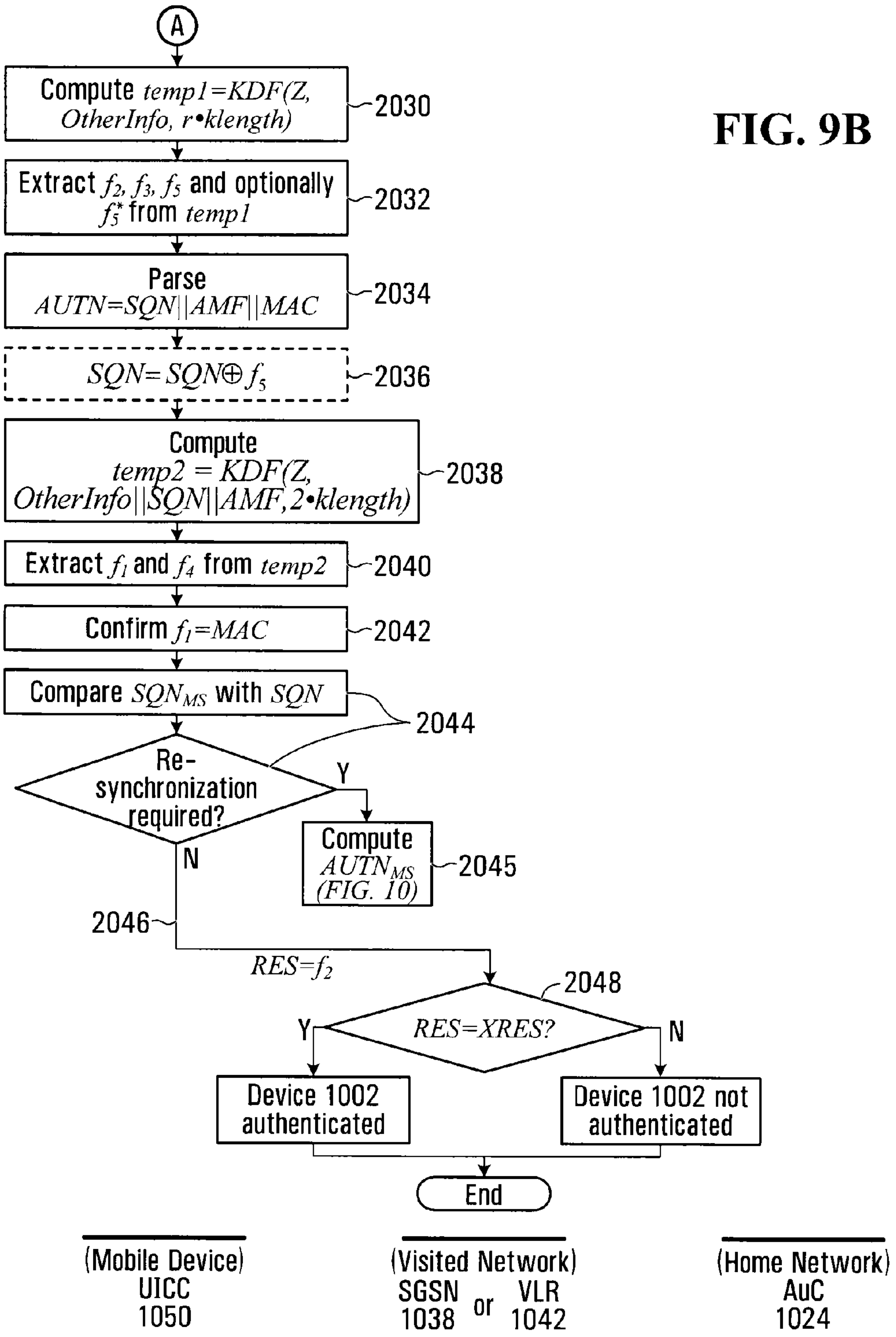

Returning to FIG. 6, upon entering the visited network 1006, the mobile device 1002 notifies the visited network 1006 of its presence and registers with the visited network 1006. The registration process 1006 includes authentication and key generation. Specifically, authentication is performed in order to verify the identity of the mobile device 1002, and secret keys are generated in order to allow for secure communication between the mobile device 1002 and the visited network 1006. To achieve this, in one embodiment, the method of FIG. 9 is performed. As described below, this method includes both authentication of the mobile device 1002 and the network, as well as generation of a cipher key CK and an integrity key IK for use in securing communication between the mobile device 1002 and the visited network 1006.

Turning therefore to FIG. 9, first in step 2002, the mobile device 1002 sends to either the VLR 1042 or the SGSN 1038 its MSI stored in the memory 1052 of the UICC 1050. Whether the MSI is sent to the VLR 1042 or the SGSN 1038 depends upon the service the mobile device 1002 is accessing. In one embodiment, the MSI is a TMSI.

Next, in step 2004, the VLR 1042 or the SGSN 1038 of the visited network 1006 makes an authentication data request to the AuC 1024 of the home network 1004. The request includes the MSI of the mobile device 1002. In one embodiment, this is the IMSI of the mobile device 1002 that corresponds to a TMSI sent from the mobile device 1002. In another embodiment, the MSI in the request is the TMSI.

Then, in step 2006, the AuC 1024 uses the MSI to retrieve from the look-up table 1062 in its memory 1060 the public key $Q_S$ of the mobile device 1002, as well as the corresponding sequence value SQN.

Next, in step 2008, the AuC 1024 generates an ephemeral private/public key pair ($k_H$,$G_H$), which may be temporarily stored in its memory 1060

In step 2010, the processor 1064 of the AuC 1024 then computes a secret value Z. The secret value Z is a secret value that is also computed by the mobile device 1002, and thus is shared between the AuC 1024 and the mobile device 1002.

In the example embodiment of FIG. 9, the shared secret value Z is computed by the processor 1064 of the AuC 1024 by performing a Menezes-Qu-Vanstone (MQV) key agreement protocol. The MQV key agreement protocol results in the computation of a shared secret value between two correspondents, such as a shared secret key or a shared secret intermediate value that can be used to derive a shared secret key. MQV key agreement is known in the art and has many variants that are also known and can be used. MQV can be preformed using either finite field cryptography or elliptic curve cryptography. Examples of MQV methods that can be used are specified in Section 5.7.2 of *NIST Special Publication* 800-56*A*, *Recommendation for Pair-Wise Key Establishment Schemes Using Discrete Logarithm Cryptography,* March 2007.

The one-pass MQV method specified in Section 5.7.2 of *NIST Special Publication* 800-56*A*, *Recommendation for Pair-Wise Key Establishment Schemes Using Discrete Logarithm Cryptography,* March 2007, is used in the embodiment illustrated in FIG. 9 and operates as follows. The method accepts as an input, keys (a,b,B,C,D) and outputs a shared secret value Z, i.e., Z=MQV(a,b,B,C,D) where typically:

a is the static private key of the device;

b is the second private key of the device;

B is the second public key of the device;

C is the static public key of the other device with which the shared secret is being shared; and D is the second public key of the other device with which the shared secret is being shared.

The specific computational operations that result in the generation of shared secret value Z from input keys (a,b,B,C,D) are specified in Section 5.7.2 of *NIST Special Publication* 800-56*A, Recommendation for Pair-Wise Key Establishment Schemes Using Discrete Logarithm Cryptography,* March 2007. In the embodiment illustrated in FIG. 9, these are the computational operations performed by the processor 1064.

However, in the method of FIG. 9, the AuC 1024 does not have a second public key of the mobile device 1002, only a static public key $Q_S$ of the mobile device 1002. Therefore the static public key $Q_S$ of the mobile device 1002 is used as both C and D in the Z=MQV(a,b,B,C,D) computation described above. Thus, in the illustrated method of FIG. 9, the processor 1064 of the AuC 1024 computes the shared secret value Z as:

$$Z=\mathrm{MQV}(d_H,k_H,G_H,Q_S,Q_S) \text{ where } a=d_H,\ b=k_H,\ B=G_H,\ C=D=Q_S.$$

Once the shared secret value Z is computed in step 2010, next in step 2012, the processor 1064 of the AuC 1024 then computes the following value:

$$\mathrm{temp1}=\mathrm{KDF}(Z,\mathrm{OtherInfo},r^*k\mathrm{length}).$$

KDF is a key derivation function, such as the ANSI X9.63 hash-based KDF using SHA-256, as specified in *X*9.63-2011, *Public Key Cryptography for the Financial Services Industry—Key Agreement and Key Transport Using Elliptic Curve Cryptography,* or such as the NIST SP800-56A hash-based KDF using SHA-256 as specified in Section 5.8.1 of *NIST Special Publication* 800-56*A, Recommendation for Pair-Wise Key Establishment Schemes Using Discrete Logarithm Cryptography,* March 2007. In the illustrated embodiment of FIG. 9, either KDF mentioned in the sentence above may be used. However, if the KDF used is that specified in Section 5.8.1 of *NIST Special Publication* 800-56*A* (which only accepts two inputs instead of three), then in the illustrated embodiment of FIG. 9 the KDF accepts as its two inputs Z||OtherInfo and r*klength, where || represents concatenation.

The inputs to the KDF described above are Z, OtherInfo, and r*klength, where the * in r*klength represents multiplication. Z is the shared secret value computed by the processor 1064 in step 2010. The value OtherInfo can include any other additional information, for example, pertaining to the mobile device 1002, the wireless carrier, and/or the method itself. In the illustrated embodiment of FIG. 9, the value OtherInfo=AlgorithmID||CarrierID||MSI, where AlgorithmID identifies the method being performed in FIG. 9, and CarrierID and MSI have been previously defined. The value r*klength represents the key data length. The longer the key data length, the longer the output of the KDF, and therefore the more keys or tags or other strings that can be extracted from the KDF output. In the illustrated embodiment, the value klength is a standard size, and it is multiplied by r in order to result in a longer output string as necessary, depending upon how many keys or tags (or other strings) are needed. As an example, r may be 2 or 3.

Next, in step 2014, the processor 1064 of the AuC 1024 extracts values $f_2$, $f_3$, $f_5$, and optionally $f_5$* from the value temp1 computed in step 2012. Specifically, the output string of the KDF (temp1) is split into a plurality of substrings, one substring assigned to each of $f_2$, $f_3$, $f_5$, and optionally $f_5$* respectively. The substring assigned to $f_2$ is the expected response value XRES, i.e. $f_2$=XRES. The substring assigned to $f_3$ is a ciphering key CK, i.e. $f_3$=CK. The substring assigned to $f_5$ is a masking key. $f_5$* is used for any resynchronization of sequence values that may be necessary. If this is generated, then another substring is assigned to this key. As will be appreciated, the more substrings required, the larger the required value of r.

Then, in step 2016, the processor 1064 of the AuC 1024 computes the following value:

$$\mathrm{temp2}=\mathrm{KDF}(Z,\mathrm{OtherInfo}\|\mathrm{SQN}\|\mathrm{AMF},2^*k\mathrm{length}).$$

KDF may be the same key derivation function as that used in step 2012, but it does not necessarily have to be. The inputs to the KDF have been previously defined except for the AMF. This is the "authentication management field" described in the document *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999. As described in this document, the AMF may be used to indicate a method and key used to generate an authentication vector (such as the vector sent in step 2024 below).

In step 2018, the processor 1064 of the AuC 1024 then extracts values $f_1$ and $f_4$ from the value temp2 computed in step 2016. Specifically, the output string of the KDF (temp2) is split into at least two substrings, and one substring is assigned to each of $f_1$ and $f_4$ respectively. The substring assigned to $f_1$ is a message authentication code (MAC), i.e., $f_1$=MAC. The MAC is also sometimes referred to as a tag. The substring assigned to $f_4$ is an integrity key IK, i.e. $f_4$=IK. In the computation of temp2 it is assumed that klength is a fixed standard size, and that it is necessary to multiply this value by 2 in order to result in a long enough output string to generate both $f_1$ and $f_4$.

Note that in the method described above, the value $f_4$ can instead be derived from temp1. A benefit of deriving $f_4$ from temp2 is that the integrity key IK=$f_4$ is then also dependent upon the sequence number and the AMF. In particular, the sequence number changes if the method is repeated at a later time, which ties temp2 (and therefore the integrity key) to yet another ephemeral value.

More generally, each of $f_1$ to $f_5$ (and optionally $f_5$*) can be generated from any of temp1 and temp2. A primary reason for computing both temp1 and temp2 in FIG. 9 is to better conform the method to the call interface described in *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999. However, variations are contemplated in which all or some of $f_1$ to $f_5$ (and optionally $f_5$*) are generated from only temp1 or temp2. Also, the exact inputs OtherInfo and OtherInfo||SQN||AMF are implementation specific and can be modified.

Returning now to FIG. 9, in optional step 2020, the processor 1064 masks the sequence number SQN by performing an exclusive OR with the key $f_5$. This step is shown in stippled lines (as optional) since the sequence number need not be masked. However, by masking the sequence number, additional concealment of the location and identity of the mobile device 1002 may be achieved. Note that in embodiments in which the sequence number is not masked, it may not be necessary to generate $f_5$ in step 2014.

Then, in step 2022, the processor 1064 creates the following string: AUTN=SQN||AMF||MAC.

Next, in step 2024, the following values are sent to the VLR 1042 or the SGSN 1038 of the visited network 1006 (depending on which one made the request) over a secure connection: ($G_H$,XRES=$f_2$,CK=$f_3$,IK=$f_4$,AUTN).

In step 2026, the VLR 1042 or SGSN 1038 of the visited network 1006 stores the received values in its local memory, and then forwards the values ($G_H$,AUTN) to the mobile device 1002, which are then forwarded by the mobile device 1002 to its UICC 1050.

In step 2028, the processor 1054 of the UICC 1050 then also computes the shared secret Z using the complementary operation of the same key agreement method as performed by the AuC 1024 of the home network 1024 in step 2010. That is, in the illustrated embodiment, the processor 1054 of the UICC 1050 computes the shared secret Z using the one-pass MQV agreement method specified in Section 5.7.2 of *NIST Special Publication* 800-56*A, Recommendation for Pair-Wise Key Establishment Schemes Using Discrete Logarithm Cryptography,* March 2007.

However, in the method of FIG. 9, the UICC 1050 does not have a second private/public key pair of the mobile device 1002, only a static private/public key pair ($d_S$,$Q_S$) of the mobile device 1002. Therefore, the static private/public key pair ($d_S$,$Q_S$) of the mobile device 1002 is used as both b and B in the MQV method. Thus, in the illustrated method of FIG. 9, the processor 1054 of the UICC 1050 computes the shared secret value Z as:

$$Z=\mathrm{MQV}(d_S,d_S,Q_S,Q_H,G_H)$$

Next, in step 2030, the processor 1054 of the UICC 1050 then computes the value temp1=KDF(Z,OtherInfo, r*klength), where KDF is the same key derivation function used in step 2012, Z is the shared secret computed in step 2028, and the values OtherInfo and r*klength are the same as those defined in step 2012.

Then, in step 2032, the processor 1054 of the UICC 1050 extracts values $f_2$, $f_3$, $f_5$, and optionally $f_5$* from the value temp1 computed in step 2022. This is achieved in the same manner as described in step 2014. The value of $f_2$ is the response value RES, i.e. $f_2$=RES. $f_3$ is the ciphering key CK, i.e. $f_3$=CK, and $f_5$ is the masking key. The key $f_5$* if generated, is used for any resynchronization of sequence values that may be necessary.

Next, in step 2034, the processor 1054 of the UICC 1050 parses the received value AUTN and stores the parsed values SQN, AMF, and MAC in memory 1052.

In optional step 2036 (illustrated in stippled lines), the processor 1054 of the UICC 1050 first unmasks the sequence number SQN before it is stored in memory 1054 by performing an exclusive OR with the key $f_5$ computed in step 2032. This optional step is only performed if masking step 2020 is performed. Note that in embodiments in which the sequence number is not masked, it may not be necessary to generate $f_5$ in step 2032.

Next, in step 2038, the processor 1054 of the UICC 1050 computes the value temp2=KDF(Z,OtherInfo||SQN||AMF, 2*klength), where KDF is the same key derivation function used in step 2016, Z is the shared secret computed in step 2028, and the other values have been previously defined.

In step 2040, the processor 1054 of the UICC 1050 then extracts values $f_1$ and $f_4$=IK from the value temp2 computed in step 2038. This is achieved in the same manner as described in step 2018.

In step 2042, the processor 1054 of the UICC 1050 confirms that $f_1$ computed in step 2040 matches the value MAC received as part of AUTN. If not, then this indicates that there is an authentication error, and the mobile station 1002 aborts the method of FIG. 9. In such a situation, the mobile device 1002 may send an error code to the visited network 1006 so that it can act accordingly. In this step, the mobile device 1002 can be said to be authenticating the network. The MAC obtained from the AUTN is considered the response value from the network, and the value $f_1$ derived from temp2 is considered the expected response value computed at the mobile device 1002. The UICC 1050 confirms that the expected response value $f_1$ is equal to the response value MAC.

Figure 10:
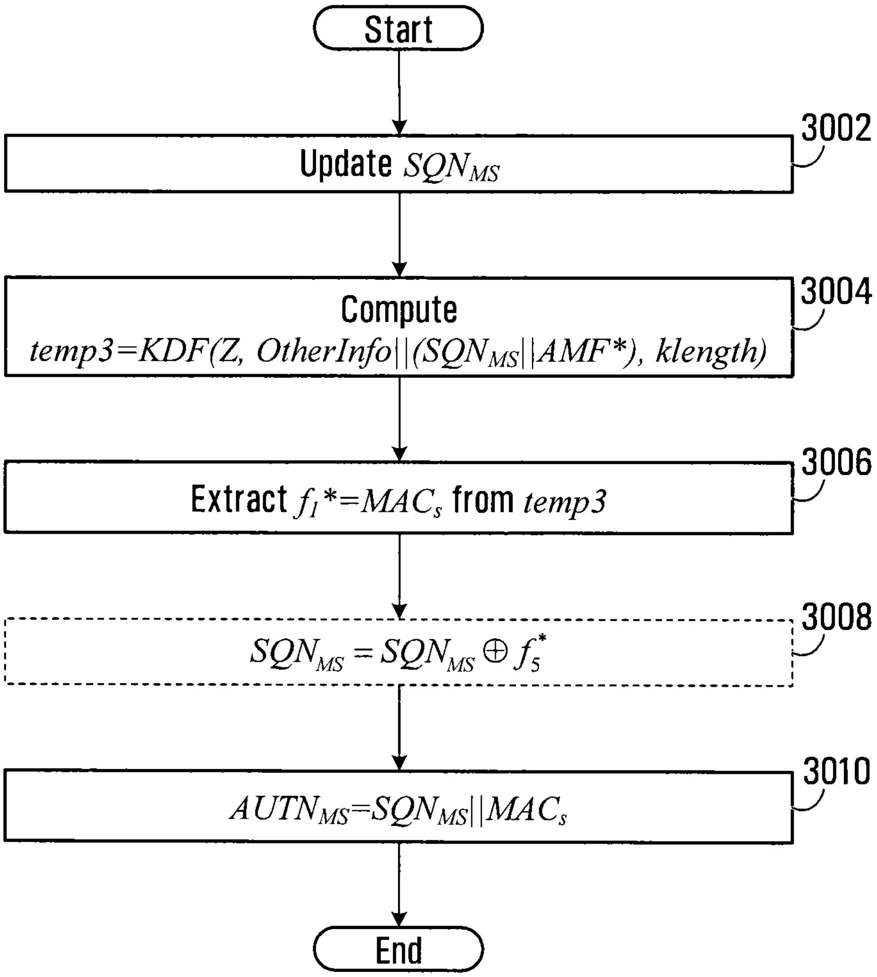
FIG. 10 is a flow diagram of a computation of an AUTN value by a mobile device for resynchronization.

Assuming the check in step 2042 is successful, in step 2044, the processor 1054 of the UICC 1050 retrieves $SQN_{MS}$ from memory 1052 and compares this value to the value SQN received as part of AUTN to determine if resynchronization is needed. If resynchronization is needed, the method proceeds to step 2045 in which the method of FIG. 10 is performed to generate a value $AUTN_{MS}$, and this value is sent back to the home network 1004 via the visited network 1006, perhaps with or in a "synchronization failure" message, as specified in section 6.3. of the 3GPP document *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999. One embodiment of a method for determining whether resynchronization is required is defined in *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999.

In step 2046, the UICC 1050 sends the value RES=$f_2$ to the VLR 1042 or the SGSN 1038 of the visited network 1006 (depending on which one made the request). In some embodiments in which resynchronization is required, the value $AUTN_{MS}$ may be also be sent. However, in other embodiments in which resynchronization is required, step 2046 is not performed and instead just the value $AUTN_{MS}$ is sent, perhaps with or in a "synchronization failure" message, as mentioned in the paragraph above.

Finally, in step 2048, the VLR 1042 or the SGSN 1038 of the visited network 1006 compares RES with XRES previously received from the AuC 1024 of the home network 1004 in step 2024. If RES=XRES, then the VLR 1042 or the SGSN 1038 of the visited network 1006 considers the mobile device 1002 to be authenticated, and the keys CK and IK can be used for securing data communication between the mobile device 1002 and the visited network 1006. Note that at the end of the method of FIG. 9 the keys CK and 1K are possessed by both the visited network 1006 and the mobile device 1002. These keys were not transferred over the insecure wireless connection between the mobile device 1002 and the visited network 1006. Instead, the keys were computed and securely sent from the home network 1004 to the visited network 1006 in step 2024, and the keys were also independently computed by the mobile device 1002 in steps 2032 and 2040. The use of the previously established key pairs ($d_H$,$Q_H$) and ($d_S$,$Q_S$) in conjunction with the operations from the MQV key agreement protocol (in steps 2010 and 2028) enabled both the authentication and the key generation via the computed shared secret value Z.

One benefit of using the method of FIG. 9 instead of the method outlined in the 3GPP document incorporated herein by reference entitled *ETSI TS* 135 205 *v*.10.0.0 "*Universal Mobile Telecommunications Systems* (*UMTS*); *LTE;* 3*G Security; Specification of the MILENAGE algorithm set: An example algorithm set for the* 3*GPP authentication and key generation functions f*1,*f*1*,*f*2,*f*3,*f*4,*f*5 *and f*5* *Document* 1: *General",* 3*GPP TS* 35.205 *version* 10.0.0 *Release* 10, as applied to the authentication and key generation method in *ETSI TS* 133 102 *v*3.5.0, "*Universal Mobile Telecommunica-*

*tions Systems* (*UMTS*); 3*G Security; Security Architecture",* 3*G TS* 33.102 *version* 3.5.0 *Release* 1999, is as follows. Instead of the home network 1004 preserving both the confidentiality and data-integrity of a secret symmetric key K that needs to be distributed to the mobile device 1002, the home network 1004 instead has to preserve the confidentiality of its private key ($d_H$), which is not distributed elsewhere, as well as the integrity of the mobile device's public key ($Q_S$). Maintaining the confidentiality of a private key and checking and preserving the integrity of another's public key is often easier than preserving both the confidentiality and data-integrity of a secret symmetric key K that has been distributed. Additionally, the method outlined in *ETSI TS* 135 205 *v.*10.0.0 "*Universal Mobile Telecommunications Systems* (*UMTS*); *LTE;* 3*G Security; Specification of the MILENAGE algorithm set: An example algorithm set for the* 3*GPP authentication and key generation functions f*1, *f*1*, *f*2, *f*3, *f*4, *f*5 *and f*5* *Document* 1: *General",* 3*GPP TS* 35.205 *version* 10.0.0 *Release* 10 is directed towards implementations in an 8-bit UICC, and is based on the algorithm used in the Advanced Encryption Standard (AES). However, computing power has advanced and 16-bit and 32-bit UICCs are more common. Thus, such UICCs have the computational power and ability to handle robust cryptographic methods such as that described in FIG. 9. Also, the method of FIG. 9 is not predicated on the security of the AES, and so is not vulnerable to any crypto-analytic advancement on the AES that may one day be discovered.

Another benefit of the method of FIG. 9 is that it lends itself to implementation in an elliptic curve cryptographic system, which is not only an efficient way to implement cryptographic operations, but is also conducive to implementing known elliptic curve cryptographic optimizations in hardware.

Turning to FIG. 10, the computation of the value $AUTN_{MS}$ will now be described. This value is computed by the processor 1054 of the UICC 1050 in step 2045 of FIG. 9 when resynchronization is needed. The method of FIG. 10 results in a value $AUTN_{MS}$ that can be used as an equivalent to the AUTS parameter specified in section 6.3 of the 3GPP document *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999.

First, in step 3002, the value of $SQN_{MS}$ is updated as necessary to conform to *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999.

Then, in step 3004, the processor 1054 of the UICC 1050 computes the value temp3=KDF(Z,OtherInfo||($SQN_{MS}$||AMF*),klength), where KDF is a key derivation function, Z is the shared secret computed by the processor 1054 in step 2028, AMF* is a default value of an authentication management field, and the other values have been previously defined.

Next, in step 3006, the processor 1054 extracts the tag $f_1^*=MAC_S$ from temp3. For example, $f_1^*$ may be a substring of the output temp3 of the key derivation function.

If the updated value of $SQN_{MS}$ is to be concealed, then optional step 3008 is performed in which the $SQN_{MS}$ is masked by performing an exclusive OR with the key $f_5^*$ computed in step 2032, i.e., $SQN_{MS}=SQN_{MS}\oplus f_5^*$.

Finally, in step 3010, the processor 1054 generates the value $AUTN_{MS}$ as: $AUTN_{MS}=SQN_{MS}||MAC_S$, where $SQN_{MS}$ is the updated value from step 3002 (possibly masked as per step 3008), and $MAC_S$ is the value computed in step 3006.

The $AUTN_{MS}$ value generated in FIG. 10 is equivalent to the AUTS parameter specified in section 6.3 of the 3GPP document *ETSI TS* 133 102 *v*3.5.0, "*Universal Mobile Telecommunications Systems* (*UMTS*); 3*G Security; Security Architecture",* 3*G TS* 33.102 *version* 3.5.0 *Release* 1999, and can be sent back to the home network 1004 and used for resynchronization as described in this 3GPP document.

Figure 11:
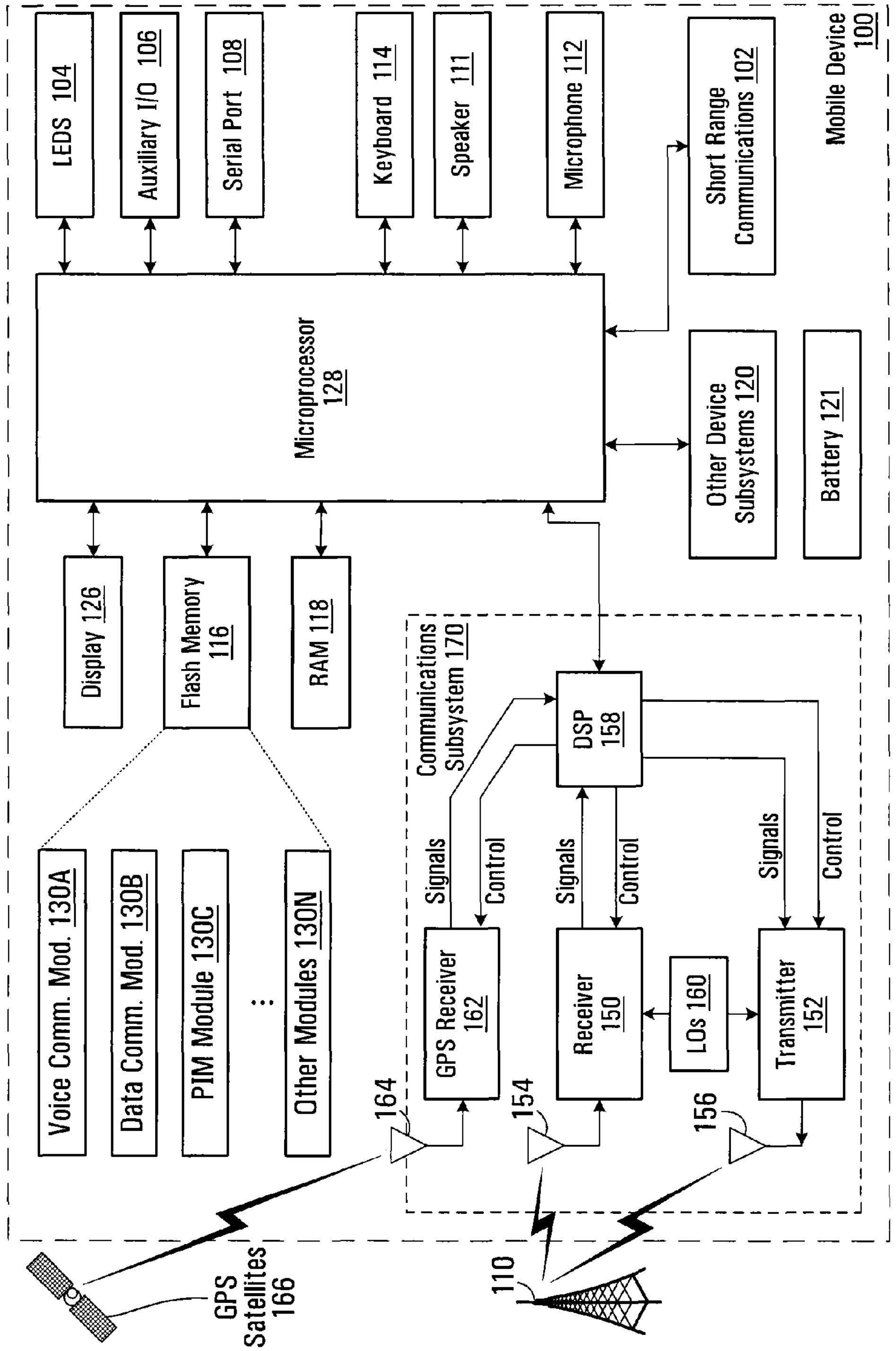
FIG. 11 is a block diagram of an embodiment of still another mobile device.

Referring now to FIG. 11, a block diagram is shown of an embodiment of another mobile device 100 that may implement any of the mobile device methods described herein. The mobile device 100 is shown with specific components for implementing features similar to those of the mobile device shown in FIGS. 3 and 7. It is to be understood that the mobile device 100 is shown with very specific details for exemplary purposes only. The mobile device 100 may be an example of the apparatus 52 or the mobile device 6 or 1002.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet. The two-way RF communication is for communicating with a network (such as network 2 or 1006).

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The communications subsystem 170 is used to communicate with a network (such as network 2 or 1006). The communications subsystem 170 is one very specific example of the communication subsystem 54 of FIG. 5.

The specific design and implementation of the communication subsystem 170 is dependent upon the communication network (such as network 2 or 1006) in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a UICC, in order to operate on a GPRS network. The UICC may by the UICC 1050, or the UICC may operate in conjunction with the other components of the mobile device 100 to implement the cryptographic system 28.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Although the foregoing has been described with reference to certain specific embodiments, various modifications thereof will be apparent to those skilled in the art without departing from the scope of the claims appended hereto. As one example, having regard to the foregoing disclosure, it is straightforward to combine some of the steps of the specific methods of FIGS. 9 and 10 in order to modify the more general method of FIG. 4.

The invention claimed is:

1. A method in a mobile device, comprising:

initiating communication with a visited network, the visited network including a verification entity, and the visited network able to communicate with a home network of the mobile device;

receiving, from the visited network, an ephemeral public key of the home network;

using the ephemeral public key of the home network and a static private key of the mobile device to participate in at least a portion of an asymmetric key agreement protocol with the home network to compute a secret value, wherein an ephemeral private key of the mobile device is not used in the asymmetric key agreement protocol and the asymmetric key agreement protocol is a Menezes-Qu-Vanstone (MQV) key agreement protocol;

obtaining a response value derived from the secret value; and sending the response value to the verification entity of the visited network for use in authenticating the mobile device.

2. The method of claim 1, wherein computing the secret value comprises computing $Z = MQV(d_S, d_S, Q_S, Q_H, G_H)$, wherein Z is the secret value, $d_S$ is the static private key of the mobile device, $Q_s$ is a public key of the mobile device corresponding to the static private key of the mobile device, $Q_H$ is a public key of the home network, $G_H$ is said ephemeral public key of the home network, and wherein MQV(•) is an MQV primitive that generates the secret value Z according to the MQV key agreement protocol.

3. The method of claim 1 wherein said obtaining a response value derived from the secret value comprises:

computing a key derivation function that accepts the secret value as an input; and obtaining the response value from an output of the key derivation function.

4. The method of claim 3 wherein said computing the key derivation function comprises computing KDF(Z,OtherInfo, outlen), wherein Z is the secret value, outlen is a parameter relating to the length of a string output by the key derivation function, and OtherInfo comprises data relating to at least one of a wireless carrier, an identity of the mobile device, and an identification of the method being used to generate the response value, and wherein KDF(•) is the key derivation function that generates the string.

5. The method of claim 1, wherein the secret value is also computed by the home network, and wherein the response value is for use by the verification entity of the visited network in authenticating the mobile device by comparing the response value to an expected response value originating from the home network, the expected response value having been derived from the secret value computed by the home network.

6. The method of claim 1, further comprising obtaining at least one key derived from the secret value, the at least one key used for securing communication between the mobile device and the visited network.

7. An apparatus for implementing a cryptographic system, wherein:

the apparatus initiates communication with a visited network, the visited network including a verification entity, and the visited network able to communicate with a home network of the apparatus;

the apparatus receives from the visited network an ephemeral public key of the home network;

the cryptographic system of the apparatus uses the ephemeral public key of the home network and a static private key of the apparatus to participate in at least a portion of an asymmetric key agreement protocol with the home network to compute a secret value, wherein an ephemeral private key of the apparatus is not used in the asymmetric key agreement protocol and the asymmetric key agreement protocol is a Menezes-Qu-Vanstone (MQV) key agreement protocol;

the cryptographic system obtains a response value derived from the secret value; and the apparatus sends the response value to the verification entity of the visited network for use in authenticating the apparatus.

8. The apparatus of claim 7 wherein the apparatus is a combination of a universal integrated circuit card (UICC) and a mobile device, and wherein either: (i) the UICC is separate from the mobile device, and the mobile device receives the UICC, or (ii) the UICC is embedded in the mobile device.

9. The apparatus of claim 8 wherein the UICC comprises a processor that performs cryptographic operations implemented by the cryptographic system.

10. The apparatus of claim 7 further comprising:

a shared secret value generator;

a processing unit;

and a communication subsystem;

wherein the shared secret value generator participates in the asymmetric key agreement protocol, the processing unit performs operations to obtain the response value, and the communication subsystem sends the response value to the verification entity.

11. The apparatus of claim 7, wherein the secret value is computed as $Z = MQV(d_S, d_S, Q_S, Q_H, G_H)$, wherein Z is the secret value, $d_S$ is the static private key of the apparatus, $Q_S$ is a public key of the apparatus corresponding to the static private key of the apparatus, $Q_H$ is a public key of the home network, $G_H$ is said ephemeral public key of the home network, and wherein MQV(•) is an MQV primitive that generates secret value Z according to the MQV key agreement protocol.

12. The apparatus of claim 7 wherein the response value is obtained by computing a key derivation function that accepts the secret value as an input, and obtaining the response value from the output of the key derivation function.

13. The apparatus of claim 12 wherein the key derivation function is computed as KDF(Z,OtherInfo,outlen), wherein Z is the secret value, outlen is a parameter relating to the length of a string output by the key derivation function, and OtherInfo comprises data relating to at least one of a wireless carrier, an identity of the apparatus, and an identification of the method being used to generate the response value, and wherein KDF(•) is the key derivation function that generates the string.

14. A non-transitory processor readable medium having stored thereon processor readable instructions that, when executed, cause a mobile device to:

initiate communication with a visited network, the visited network including a verification entity, and the visited network able to communicate with a home network of the mobile device;

receive from the visited network an ephemeral public key of the home network;

use the ephemeral public key of the home network and a static private key of the mobile device to participate in at least a portion of an asymmetric key agreement protocol with the home network to compute a secret value, wherein an ephemeral private key of the mobile device is not used in the asymmetric key agreement protocol and the asymmetric key agreement protocol is a Menezes-Qu-Vanstone (MQV) key agreement protocol;

obtain a response value derived from the secret value; and send the response value to the verification entity of the visited network for use in authenticating the mobile device.

15. The non-transitory processor-readable medium of claim 14, wherein the non-transitory processor readable medium comprises a magnetic cassette or a magnetic tape or magnetic disk storage or an optical disk or a CD-ROM or a DVD or volatile storage memory or non-volatile storage memory or RAM or ROM or EEPROM or flash memory.

16. The non-transitory processor-readable medium of claim 14, wherein computing the secret value comprises computing $Z = MQV(d_S, d_S, Q_S, Q_H, G_H)$, wherein Z is the secret value, $d_s$ is the static private key of the mobile device, $Q_s$ is a public key of the mobile device corresponding to the static private key of the mobile device, $Q_H$ is a public key of the home network, $G_H$ is said ephemeral public key of the home network, and wherein MQV(•) is an MQV primitive that generates the secret value Z according to the MQV key agreement protocol.

17. The non-transitory processor-readable medium of claim 14, wherein the secret value is also computed by the home network, and wherein the response value is for use by the verification entity of the visited network in authenticating the mobile device by comparing the response value to an expected response value originating from the home network, the expected response value having been derived from the secret value computed by the home network.

* * * * *